United States Patent
Moriwaki et al.

(10) Patent No.: US 6,693,644 B1
(45) Date of Patent: Feb. 17, 2004

(54) GRAPHIC ACCELERATOR REDUCING AND PROCESSING GRAPHICS DATA

(75) Inventors: Shohei Moriwaki, Hyogo (JP); Yoshifumi Azekawa, Hyogo (JP); Osamu Chiba, Hyogo (JP); Kazuhiro Shimakawa, Hyogo (JP)

(73) Assignees: Renesas Technology Corp., Tokyo (JP); Mitsubishi Electric System LSI Design Corporation, Hyogo (JP)

( * ) Notice: Subject to any disclaimer, the term of this patent is extended or adjusted under 35 U.S.C. 154(b) by 461 days.

(21) Appl. No.: 09/668,349

(22) Filed: Sep. 25, 2000

(30) Foreign Application Priority Data

Nov. 16, 1999 (JP) .......................................... 11-325215
May 23, 2000 (JP) ........................................ 2000-151101

(51) Int. Cl.$^7$ ................................................ G09G 5/02
(52) U.S. Cl. ...................................... 345/604; 345/600
(58) Field of Search ................................ 345/600, 603, 345/604, 605, 545, 549

(56) References Cited

U.S. PATENT DOCUMENTS 5,262,847 A * 11/1993 Rodriguez et al. ............ 358/21
5,920,322 A * 7/1999 Ulichney ..................... 345/604

FOREIGN PATENT DOCUMENTS

| CA | 1314095 | 3/1993 |
| JP | 64-53680 | 3/1989 |
| JP | 2-100465 | 4/1990 |
| JP | 4-307894 | 10/1992 |
| JP | 8-294142 | 11/1996 |
| JP | 8-336163 | 12/1996 |

* cited by examiner

Primary Examiner—Matthew Luu
(74) Attorney, Agent, or Firm—McDermott, Will & Emery (57) ABSTRACT

A graphic accelerator includes a RGB/YUV conversion unit converting color information of the RGB format included in the drawing instruction into a format including luminance and color difference components, a drawing instruction execution unit compressing the color difference component converted by the RGB/YUV conversion unit and generates pixel information according to the drawing instruction, a screen data output unit expanding pixel information generated by the drawing instruction execution unit, and a YUV/RGB conversion unit converting the pixel information expanded by the screen data output unit into pixel information of the RGB format. Therefore, the amount of data of the color difference component can be reduced to improve the processing speed.

10 Claims, 5 Drawing Sheets

GRAPHIC ACCELERATOR REDUCING AND PROCESSING GRAPHICS DATA

BACKGROUND OF THE INVENTION

1. Field of the Invention

The present invention relates to a graphic accelerator that carries out image display processing. More particularly, the present invention relates to a graphic accelerator that improves processing speed by reducing graphics data, and a drawing method thereof.

2. Description of the Background Art

Modernly, a graphic accelerator which is a dedicated LSI (Large Scale Integrated Circuit) to execute the drawing process of an image at high speed is employed in personal computers, video game machines and the like in order to output a fine image of visual realism.

Figure 1:
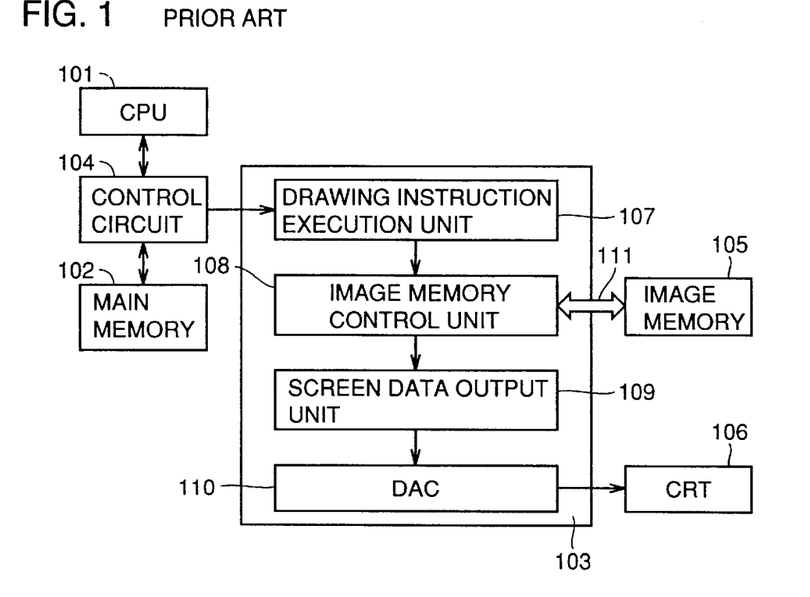
FIG. 1 is a block diagram showing a schematic structure of a graphics apparatus including a conventional graphic accelerator.

FIG. 1 is a block diagram of a typical computer or video game's graphics apparatus including a conventional graphic accelerator. This graphics apparatus includes a CPU (Central Processing Unit) 101 controlling the entire apparatus, a main memory 102, a graphic accelerator 103, a control circuit 104 controlling generation of a timing signal and data input/output with respect to main memory 102 and graphic accelerator 103, an image memory 105 used in processing graphics data, and a CRT (Cathode Ray Tube) 106 where an image is displayed.

Graphic accelerator 103 includes a drawing instruction execution unit 107 processing the input drawing instruction and converting parameters into graphics data with pixels forming the screen as the basic unit, an image memory control unit 108 writing drawing image with pixels as the basic unit from drawing instruction execution unit 107 into image memory 105 and reading out graphics data from image memory 105, a screen data output unit 109 converting graphics data read out from image memory 105 into data of the display format of CRT 106, and a DAC (Digital/Analog Converter) 110 converting digital signals output from screen data output unit 109 into analog signals. The processing contents carried out by drawing instruction execution unit 107 and screen data output unit 109 are well known in the field of art. Therefore, detailed description thereof will not be provided.

In the graphics apparatus of FIG. 1, the data transfer speed of an image memory interface bus 111 between image memory control unit 108 in graphic accelerator 103 and image memory 105 often becomes the bottleneck in determining the drawing processing performance. This is because the data transfer speed between graphic accelerator 103 and image memory 105 is significantly low with respect to the processing speed of graphic accelerator 103 since graphic accelerator 103 and image memory 105 are formed of separate semiconductor components.

As a method of improving the data transfer speed between graphic accelerator 103 and image memory 105, the method of increasing the bus width of image memory interface bus 111, and the method of improving the data transfer frequency of image memory 105 are known. However, the method of increasing the bus width of image memory interface bus 111 induces the problem of increasing the area of the circuit substrate where graphic accelerator 103 is mounted, increasing the circuit complexity due to bus width expansion, increasing the area for mounting image memory 105, and the like. The method of improving the data transfer frequency of image memory 105 is disadvantageous in that an image memory of a large capacity and of short access time is not available at a low cost. Thus, there was a problem that it is difficult to provide a graphic accelerator improved in processing speed without increasing the cost.

SUMMARY OF THE INVENTION

An object of the present invention is to provide a graphic accelerator that can improve the processing speed of graphics processing.

Another object of the present invention is to provide a graphic accelerator that can reduce the capacity of the image memory used in processing graphics data.

A further object of the present invention is to provide a graphic accelerator that can reduce the circuit scale of the arithmetic unit and the like.

Still another object of the present invention is to provide a drawing method that can improve the speed of drawing processing.

A still further object of the present invention is to provide a drawing method that can reduce the capacity of the image memory used in processing graphics data.

Yet a further object of the present invention is to provide a drawing method that can reduce the circuit size of the arithmetic unit and the like.

According to an aspect of the present invention, a graphic accelerator includes a first conversion unit converting pixel information represented by the colorimetric system using stimulus values of the three primary colors such as the RGB format into pixel information of a format including a luminance component and a color difference component, a data compression unit compressing the color difference component of the pixel information converted by the first conversion unit, a drawing unit generating graphics data according to the luminance component converted by the first conversion unit and the color difference component compressed by the data compression unit, a data expansion unit expanding the graphics data generated by the drawing unit, and a second conversion unit converting the graphics data expanded by the data expansion unit into graphics data represented by the aforementioned colorimetric system.

Since the drawing unit generates graphics data according to the luminance component converted by the first conversion unit and the color difference component compressed by the data compression unit, the amount of data transfer of the graphics data can be reduced to improve the processing speed. Also, the capacity of the image memory storing graphics data can be reduced since the amount of graphics data is reduced.

According to another aspect of the present invention, a drawing method includes the steps of converting pixel information represented by the colorimetric system using stimulus values of the three primary colors such as the RGB format into pixel information of a format including a luminance component and a color difference component, compressing the color difference component of the converted pixel information, generating graphics data according to the converted luminance component and the compressed color difference component, expanding the generated graphics data, and converting the expanded graphics data into graphics data represented by the aforementioned colorimetric system.

Since graphics data is generated according to the converted luminance component and the compressed color difference component, the data transfer amount of graphics data can be reduced to improve the processing speed. Since the amount of graphics data is reduced, the capacity of the image memory storing graphics data can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 2:
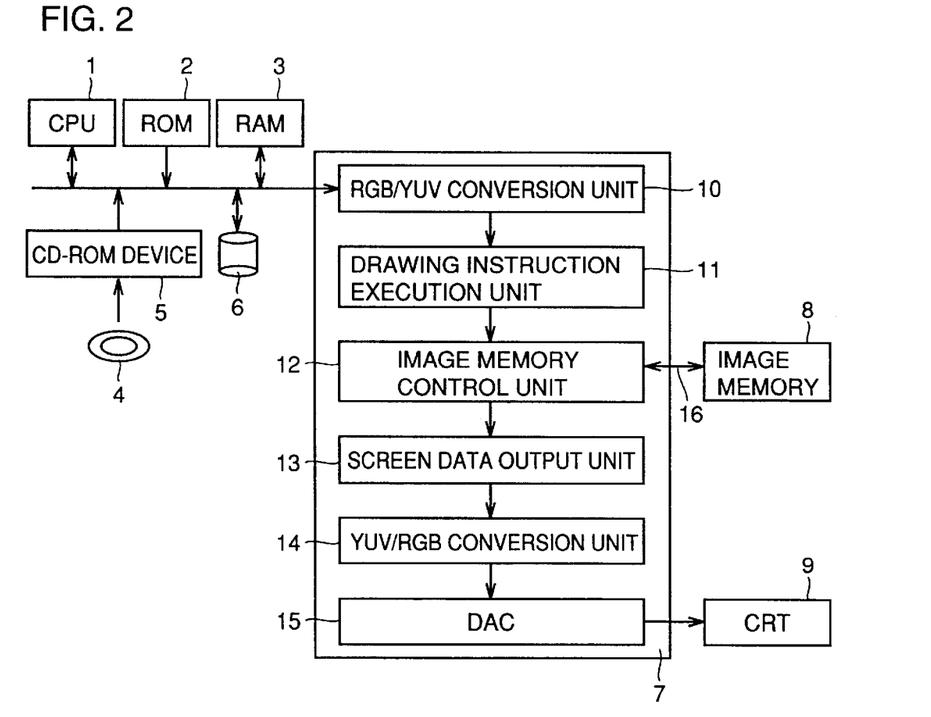
FIG. 2 is a block diagram showing a schematic structure of a graphics apparatus including a graphic accelerator according to a first embodiment of the present invention.

Referring to FIG. 2, the apparatus with a graphic accelerator of the first embodiment includes a CPU 1 providing the overall control of the apparatus, a ROM (Read Only Memory) 2 storing the basic program of the apparatus, a RAM (Random Access Memory) 3 storing the process data and program by CPU 1, a CD-ROM (Compact Disc-Read Only Memory) 4 storing a program, a CD-ROM device 5 reading CD-ROM 4, a hard disc device 6, a graphic accelerator 7, an image memory 8 used in processing graphics data, and a CRT 9 where an image is displayed.

Graphic accelerator 7 includes a RGB/YUV conversion unit 10 converting color information of the RGB format included in the drawing instruction into data of the YUV format, a drawing instruction execution unit 11 processing the drawing instruction including color information of the YUV format into pixel information and compressing the pixel information, an image memory control unit 12 writing into image memory 8 the pixel information generated by drawing instruction execution unit 11 and reading out pixel information from image memory 8, a screen data output unit 13 converting the pixel information read out from image memory 8 into display data of CRT 9, a YUV/RGB conversion unit 14 converting display data of the YUV format into display data of the RGB format, and a DAC 15 converting the display data of the RGB digital format output from YUV/RGB conversion unit 14 into analog signals.

RGB/YUV conversion unit 10 receives in the RGB format the color information included in the drawing instruction that is the object of the drawing processing via CPU 1 and converts the color information into the YUV format. This conversion process is carried out according to the following equations (1)–(3).

$$Y = 0.290R + 0.587G + 0.114B \quad (1)$$
$$= \left(\frac{1}{4} + \frac{1}{32} + \frac{1}{64}\right)R + \left(\frac{1}{2} + \frac{1}{16} + \frac{1}{32}\right)G + \left(\frac{1}{16} + \frac{1}{32} + \frac{1}{64}\right)B$$

$$V = Cb \quad (2)$$
$$= -0.1687R - 0.3313G + 0.500B$$
$$= -\left(\frac{1}{8} + \frac{1}{32} + \frac{1}{64}\right)R - \left(\frac{1}{4} + \frac{1}{16} + \frac{1}{64}\right)G + \frac{1}{2}B + 128$$

$$U = Cr \quad (3)$$
$$= 0.500R - 0.4187G + 0.0813B$$
$$= \frac{1}{2}R - \left(\frac{1}{4} + \frac{1}{8} + \frac{1}{32} + \frac{1}{64}\right)G + \left(\frac{1}{16} + \frac{1}{64}\right)B + 128$$

In the present embodiment, color information of the RGB format is converted into color information of the YUV format. However, the present invention provides similar advantages even if the color information is converted into another format constituted by a luminance component signal and a color difference component signal.

Figure 3:
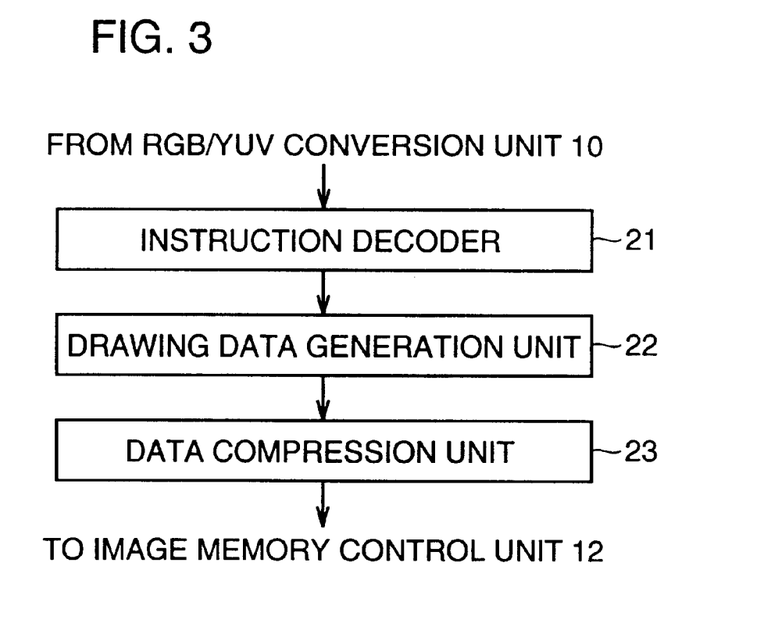
FIG. 3 is a block diagram to describe in further detail a drawing instruction execution unit 11 in the graphic accelerator of FIG. 2.

FIG. 3 is a block diagram to describe in further detail drawing instruction execution unit 11 in graphic accelerator 7 of FIG. 2. Drawing instruction execution unit 11 includes an instruction decoder 21 interpreting the drawing instruction from CPU 1 via RGB/YUV conversion unit 10, a graphics data generation unit 22 converting parameters into pixel information of the YUV format according to the interpreted result from instruction decoder 21, and a data compression unit 23 compressing data by removing UV information which is the color difference component from the pixel information of the YUV format generated by graphics data generation unit 22.

Here, the drawing instruction executed by drawing instruction execution unit 11 includes a straight line drawing instruction, a rectangle drawing instruction, a clear instruction, a filling instruction and a text drawing instruction for a two-dimensional image, and also polygon vertex coordinate data, texture coordinate data, blending color information for texture, transparency information, depth information value and the like for a three-dimensional image. Instruction decoder 21 decodes the received drawing instruction from CPU 1 to determine which of these instructions the current drawing instruction is.

Figure 4A:
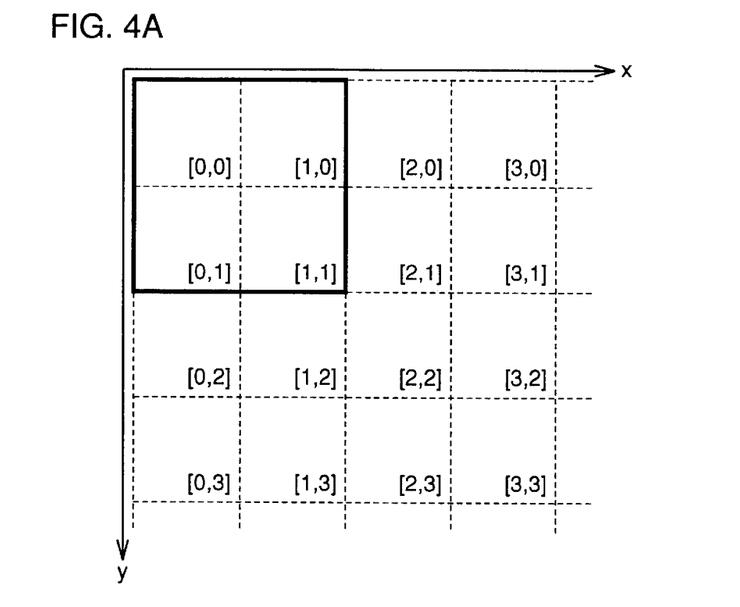
FIGS. 4A–4C are diagrams to describe the pixel information generation process by a graphics data generation unit 22 and a data compression method by a data compression unit 23.
Figure 4B:
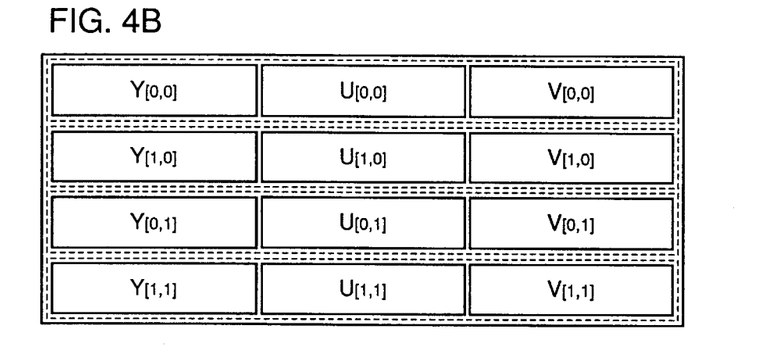
Figure 4C:
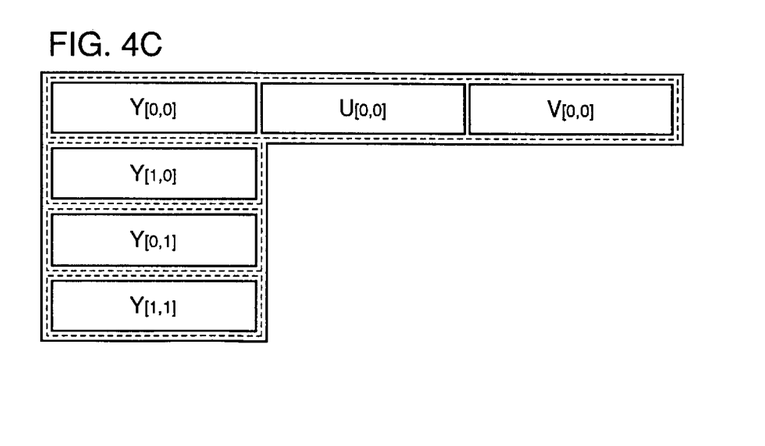

FIGS. 4A–4C are diagrams to describe the pixel information generation process by graphics data generation unit 22 and the data compression method by data compression unit 23. Graphics data generation unit 22 generates control data of the pixel information forming a screen according to the interpreted result of the drawing instruction by instruction decoder 21. Here, pixel information refers to pixel color information determined by the combination of the three colors of RGB in the conventional art, which is represented by the YUV format in the present embodiment.

As a specific process by graphics data generation unit 22, pixels arranged as shown in FIG. 4A are subjected to the filling instruction to result in the image of pixel information shown in FIG. 4B. Control data of the pixel information indicated by the coordinates [0, 0], [1, 0], [0, 1], [1, 1] are generated. Similarly, control data are also generated for pixels having the pixel information determined by the filling instruction (not shown).

Next, the data compression process by data compression unit 23 will be described. In general, human vision is sensitive to the change in luminance component Y and rather insensitive to the change in the color difference components U and V. Pixel information of the YUV format is compressed taking advantage of this feature in human vision.

Specifically as to the control data of the pixel information generated by graphics data generation unit 22, the pixel information of four adjacent pixels [0, 0], [1, 0], [0, 1], [1, 1] are to be compressed. Since human vision is rather insensitive to the change in color difference components U and V, color difference components $U_{[0, 0]}$ and $V_{[0, 0]}$ of pixel [0, 0] out of the four pixels are employed as the representative values of the color difference component, and other color difference component information are deleted. Therefore, the pixel information of the four pixels is reduced to the luminance components of $Y_{[0, 0]}$, $Y_{[1, 0]}$, $Y_{[0, 1]}$ and $Y_{[1, 1]}$, and the color difference components of $U_{[0, 0]}$ and $V_{[0, 0]}$.

Although color difference components $U_{[0, 0]}$ and $V_{[0, 0]}$ of pixel [0, 0] are used as the representative values of the color difference components according to the above description, the color difference component value of another pixel can be used as the representative value of the color difference component. Alternatively, an average of the color difference component values of a plurality of pixels, for example the average of color difference components $U_{[0, 0]}$, $U_{[1, 0]}$, $U_{[0, 1]}$ and $U_{[1, 1]}$ and the average of color difference components $V_{[0, 0]}$, $V_{[1, 0]}$, $V_{[0, 1]}$ and $V_{[1, 1]}$ of four pixels, can be used as the representative values of the color difference components.

Regarding the data compression method, equal advantages can be obtained even by using the compression method of 4:2:2 or 4:2:0 and the like defined in ITU (International Telecommunication Union) Recommendation 601. Also, although the pixel information of four adjacent pixels are compressed in the above description, the compression efficiency can be further improved by compressing more pixels according to a similar manner.

By virtue of compressing the control data of the pixel information in drawing instruction execution unit 11 and writing the data into image memory 8, the required memory capacity of image memory 8 can be reduced. Also, the amount of data transfer per unit time along the bus between graphic accelerator 7 and image memory 8 can be reduced. Therefore, the bottleneck caused by the data transfer speed of this bus can be eliminated.

Image memory control unit 12 sequentially writes the pixel information into image memory 8 according to the control data of the pixel information generated by drawing instruction execution unit 1. Image memory control unit 12 also reads out pixel information from image memory 8 at a predetermined timing for output to screen data output unit 13. In the case where image memory 8 is a D-RAM (Dynamic-Random Access Memory), image memory control unit 12 refreshes image memory 8 at a predetermined timing.

Figure 5:
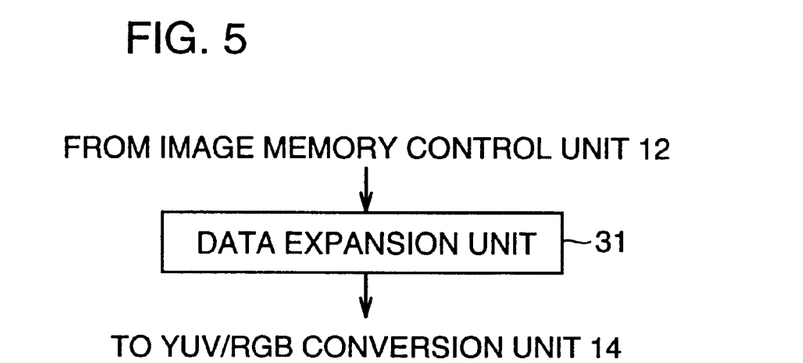
FIG. 5 is a diagram to describe in further detail the screen data output unit in the graphic accelerator of FIG. 2.

FIG. 5 is a block diagram to describe in further detail screen data output unit 13 of graphic accelerator 7 shown in FIG. 2. Screen data output unit 13 includes a data expansion unit 31 expanding pixel information input via image memory control unit 12.

Data expansion unit 31 expands the compressed pixel information of the YUV format and generates graphics data corresponding to each display pixel. For example, when four adjacent pixels are compressed as shown in FIG. 4C, expansion is effected by assigning $U_{[0, 0]}$ and $V_{[0, 0]}$ to the color difference component information of pixels [0, 1], [1, 0] and [1, 1].

YUV/RGB conversion unit 14 converts the graphics data of the YUV format output from screen data output unit 13 into graphics data of the RGB format. This conversion is carried out according to the following equations.

$$R = Y + 1.403 Cr \qquad (4)$$
$$= Y + \left(1 + \frac{1}{4} + \frac{1}{8} + \frac{1}{32}\right)(Cr - 128)$$

$$G = Y - 0.714 Cr - 0.344 Cb \qquad (5)$$
$$= Y - \left(\frac{1}{4} + \frac{1}{16} + \frac{1}{32}\right)(Cr - 128) - \left(\frac{1}{2} + \frac{1}{8} + \frac{1}{16} + \frac{1}{32}\right)(Cb - 128)$$

$$B = Y + 1.773 Cb \qquad (6)$$
$$= Y + \left(1 + \frac{1}{2} + \frac{1}{4} + \frac{1}{64}\right)(Cb - 128)$$

DAC 15 converts digital signals which are the graphics data of the RGB format converted by YUV/RGB conversion unit 14 into analog signals and provides the analog signals to CRT 9. CRT 9 provides display according to the analog signals.

According to the graphic accelerator of the present embodiment, the recording format of the pixel data in image memory 8 is converted into the YUV format from the RGB format, and data is compressed sharing color difference components U and V of adjacent pixels. Therefore, the capacity of image memory 8 can be reduced. Also, the processing speed of drawing instruction execution unit 11, and in turn the processing speed of graphic accelerator 7, can be improved since the number of accesses to image memory 8 by drawing instruction execution unit 11 is reduced in accordance with reduction of the pixel information. Furthermore, an economic graphics apparatus can be provided since the bus width of image memory interface bus 16 of the graphic accelerator of the present embodiment can be reduced in the case of a data transfer speed identical to that of the conventional graphic accelerator.

Second Embodiment

A graphic accelerator according to a second embodiment of the present invention differs from the graphic accelerator of the first embodiment in the function of data compression unit 23 shown in FIG. 3 and data expansion unit 31 shown in FIG. 5. Therefore, detailed description of the same structure and function will not be repeated. The data compression unit and the data expansion unit are labeled 23a and 31a, respectively, in the present embodiment.

Since the human vision is insensitive with respect to change in color difference components U and V, data is compressed by reducing the precision of color difference components U and V in the present embodiment.

Figure 6:
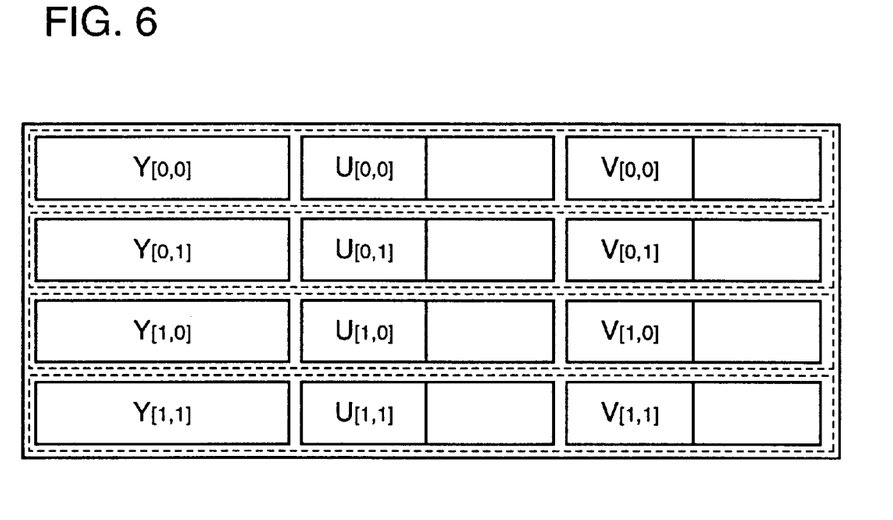
FIG. 6 is a diagram to describe the process of a data compression unit 23a in the graphic accelerator according to a second embodiment of the present invention.

FIG. 6 is a diagram to describe the process of data compression unit 23a in the graphic accelerator of the present embodiment. As to luminance components $Y_{[0, 0]}$, $Y_{[0, 1]}$, $Y_{[1, 0]}$ and $Y_{[1, 1]}$, the luminance component Y subjected to the conversion to the YUV format is exactly employed without degrading the precision. As to color difference components $U_{[0, 0]}$, $U_{[0, 1]}$, $U_{[1, 0]}$ and $U_{[1, 1]}$, only the predetermined higher order bits of color difference component U subjected to conversion to the YUV format are used and the lower order bits are deleted for data compression. Similarly, as to color difference components $V_{[0, 0]}$, $V_{[0, 1]}$, $V_{[1, 0]}$ and $V_{[1, 1]}$, only predetermined higher order bits of color difference component V subjected to conversion to the YUV format are used and the lower order bits are removed for data compression.

Data expansion unit 31a sets predetermined data to the deleted lower order bits of color difference components $U_{[0, 0]}$, $U_{[0, 1]}$, $U_{[1, 0]}$ and $U_{[1, 1]}$ to expand data. For example, "0" is set for all the bits of the lower order bits for data expansion. Although data is compressed by deleting the lower order bits of the color difference component in data compression, the number of bits to be deleted can be appropriately set by an external register. The graphics apparatus can realize a display corresponding to the usage status by altering the number of bits to be deleted depending upon the resolution and number of colors of CRT 9.

According to the graphic accelerator of the present embodiment, data compression is carried out by deleting only the lower order bits of the color difference component. Therefore, the graphic accelerator can be implemented by a further simple structure in comparison to that of the graphic accelerator of the first embodiment.

Third Embodiment

A graphic accelerator according to a third embodiment of the present invention differs from the graphic accelerator of the first embodiment in the function of data compression unit 23 shown in FIG. 3 and data expansion unit 31 shown in FIG. 5. Therefore, details of the same structure and function will not be repeated. The data compression unit and the data expansion unit are labeled 23b and 31b, respectively, in the present embodiment.

Data compression unit 23b of the present embodiment has the data compression method of the second embodiment of FIG. 6 added to the data compression method of the first embodiment shown in FIG. 4. More specifically, only color difference components $U_{[0, 0]}$ and $V_{[0, 0]}$ of pixel [0, 0] which are representative values are left, and the color difference component information of the other pixels are removed from the color difference components U and V of four adjacent pixels. Then, the lower order bits of color difference components $U_{[0, 0]}$ and $V_{[0, 0]}$ of pixel [0, 0] are deleted for data compression.

Data expansion unit 31b assigns $U_{[0, 0]}$ and $V_{[0, 0]}$ to the color difference component information of pixels [0, 1], [1, 0] and [1, 1]. Then, predetermined data is set to the lower order bits of each color difference component information to expand data.

According to the graphic accelerator of the present embodiment, data is compressed by sharing the color difference components of adjacent pixels and deleting the lower order bits of color difference component data for data compression. Therefore, the amount of data can be reduced by data compression in comparison to the graphic accelerator of the first and second embodiments.

Fourth Embodiment

A graphic accelerator according to a fourth embodiment of the present embodiment differs from the graphic accelerator of the first embodiment in the function of data compression unit 23 shown in FIG. 3 and data expansion unit 31 shown in FIG. 5. Therefore, details of the same structure and function will not be repeated. The data compression unit and the data expansion unit are labeled 23c and 31c, respectively, in the present embodiment.

Since human vision is insensitive with respect to change in color difference components U and V, data is compressed by sharing color difference components U and V between frames in the present embodiment.

Figure 7:
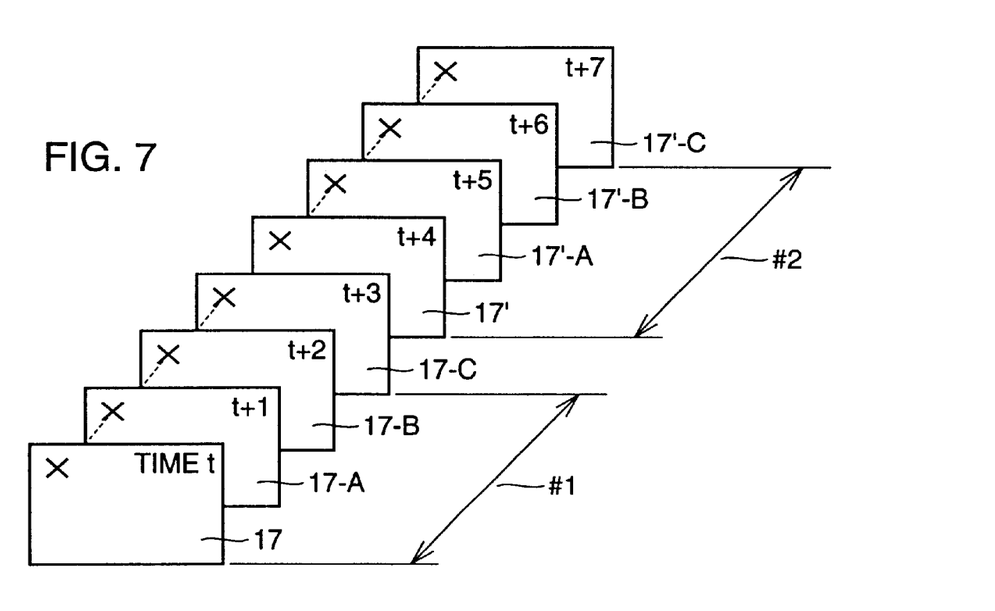
FIG. 7 is a diagram to describe a process of a data compression unit 23c in a graphic accelerator according to a fourth embodiment of the present invention.

FIG. 7 is a diagram to describe the process of a data compression unit 23c in the graphic accelerator of the present embodiment. As shown in FIG. 7, the drawing process is carried out by sequentially writing the data of the frame into image memory 8. These frames are grouped for every several frames. The color difference component information of pixel information of the same coordinate are shared in this group of the plurality of frames.

In the drawing process of frame 17 shown in FIG. 7, data compression unit 23c does not compress the pixel information converted into the YUV format. Graphics data generation unit 22 carries out the drawing process using pixel information that is not compressed. As to the frames included in frame group #1, data compression unit 23c deletes all the color difference component information in the drawing process of frames 17-A, 17-B and 17-C. Then, graphics data generation unit 22 processes only the luminance component information to generate graphics data. Image memory control unit 12 writes the luminance component information into the region of image memory 8 where the luminance component information is to be recorded. As to frame group #1, the luminance component information and color difference component information are manipulated only in the first frame 17 and written into image memory 8. For subsequent frames 17-A, 17-B and 17-C in frame group #1, only the luminance component information is manipulated and written into image memory 8. Therefore, the processing speed of drawing instruction execution unit 11 can be improved. The capacity of image memory 8 can be reduced.

In the present embodiment, four frames are taken as one group. By increasing the number of frames of which the color difference component information is shared, the processing speed of drawing instruction execution unit 11 can be further improved, and the capacity of image memory 8 can be further reduced. However, it is to be noted that the picture quality will be degraded by increasing the number of frames that share the color difference component information. The number of frames sharing the color difference component information can be set appropriately by an external-operable register.

According to the graphic accelerator of the present embodiment, a plurality of frames are taken as one group, and color difference component information shared by the plurality of frames. Therefore, the processing speed of drawing instruction execution unit 11 can be improved and the capacity of image memory 8 reduced without significantly degrading the picture quality of the image.

Fifth Embodiment

A graphic accelerator according to a fifth embodiment of the present invention differs from the graphic accelerator of the first embodiment in the function of drawing instruction execution unit 11 and RGB/YUV conversion unit 10 of FIG. 2. Therefore, detailed description of the same structure and function will not be repeated. The drawing instruction execution unit, the RGB/YUV conversion unit, instruction decoder, graphics data generation unit and data compression unit are labeled 11e, 10e, 21e, 22e and 23e, respectively. A color space conversion unit 24 has a structure and function identical to those of RGB/YUV conversion unit 10 of FIG. 2.

Figure 8:
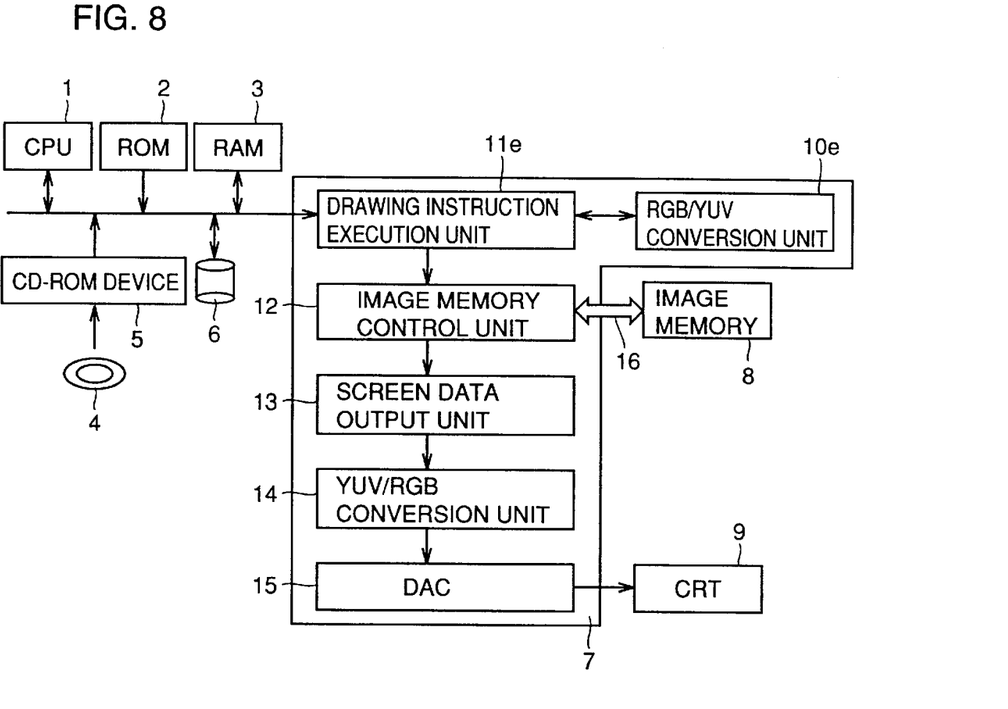
FIG. 8 is a block diagram showing a schematic structure of a graphics apparatus including a graphic accelerator according to a sixth embodiment of the present invention.
Figure 9:
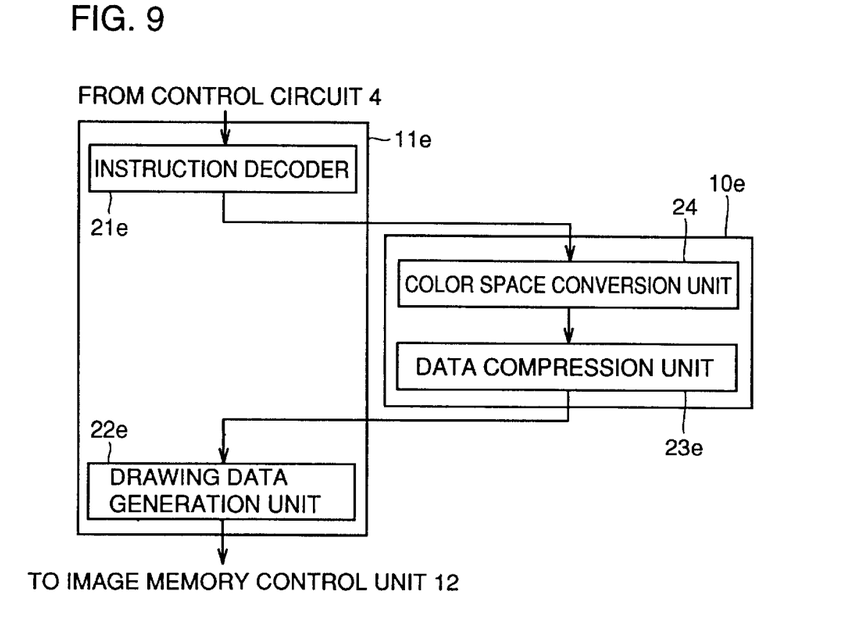
FIG. 9 is a diagram to describe in further detail a drawing instruction execution unit 11e and a RGB/YUV conversion unit 10e of FIG. 8.

The graphic accelerator of the present embodiment is directed to reduce circuit overhead by providing a RGB/YUV conversion unit 10e between instruction decoder 21e and graphics data generation unit 22e in drawing instruction execution unit 11e according to the structure of the graphic accelerator of the first embodiment of FIG. 2, as shown in FIGS. 8 and 9.

More specifically, in the first embodiment, following the conversion of the drawing instruction input from CPU 1 into pixel data of the RGB format by instruction decoder 21 and graphics data generation unit 22, the data is converted into pixel data of the YUV format by RGB/YUV conversion unit 10 and the color information is reduced by data compression unit 23. However, this method has a disadvantage in that the circuit overhead is great since conversion into pixel data of the RGB format is carried out.

For the purpose of solving this problem, the present embodiment includes a process of reducing the color information within a range that does not alter the visual effect by RGB/YUV conversion unit 10e prior to processing of graphics data in pixel units by graphics data generation unit 22e. Reduction of color information carried out by data compression unit 23e in the present embodiment is implemented by reducing the lower order bits of the color difference component in the previous second embodiment.

According to the graphic accelerator of the present embodiment, color information is reduced prior to processing of the drawing instruction into graphics data formed of a plurality of pixels. Therefore, the arithmetic unit and the like can be realized with lower circuit complexity than that of the graphic accelerator of the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A graphic accelerator comprising:
a first conversion unit converting pixel information represented by a colorimetric system using stimulus values of the three primary colors into pixel information of a format including a luminance component and a color difference component;
a data compression unit compressing the color difference component of the pixel information converted by said first conversion unit;
a drawing unit generating graphics data according to the luminance component converted by the first conversion unit and the color difference component compressed by said data compression unit;
a data expansion unit expanding graphics data generated by said drawing unit; and
a second conversion unit converting the graphics data expanded by said data expansion unit into graphics data represented by said colorimetric system.

2. The graphic accelerator according to claim 1, wherein said data compression unit compresses data by determining a representative value of the color difference component according to pixel information of adjacent pixels, and deleting the color difference component other than the representative value.

3. The graphic accelerator according to claim 1, wherein said data compression unit compresses data by deleting a lower order bit of the color difference component.

4. The graphic accelerator according to claim 1, wherein said data compression unit compresses data by determining a representative value of the color difference component according to pixel information of adjacent pixels, deleting the color difference component other than the representative value, and deleting a lower order bit of said representative value of the color difference component.

5. The graphic accelerator according to claim 1, wherein said data compression unit compresses data by sharing color difference components of pixels of the same coordinate in a plurality of frames.

6. A drawing method comprising the steps of:
converting pixel information represented by a colorimetric system using stimulus values of the three primary colors into pixel information of a format including a luminance component and a color difference component;
compressing the color difference component of said converted pixel information;
generating graphics data according to said converted luminance component and said compressed color difference component;
expanding said generated graphics data; and
converting said expanded graphics data into graphics data represented by said colorimetric system.

7. The drawing method according to claim 6, wherein said step of compressing the color difference component of said converted pixel information comprises the step of compressing data by determining a representative value of the color difference component according to pixel information of adjacent pixels, and deleting the color difference component other than the representative value.

8. The drawing method according to claim 6, wherein said step of compressing the color difference component of said converted pixel information comprises the step of compressing data by deleting a lower order bit of the color difference component.

9. The drawing method according to claim 6, wherein said step of compressing the color difference component of said converted pixel information comprises the step of compressing data by determining a representative value of the color difference component according to pixel information of adjacent pixels, deleting the color difference component other than the representative value, and deleting the lower order bit of the representative value of said color difference component.

10. The drawing method according to claim 6, wherein said step of compressing the color difference component of said converted pixel information includes the step of compressing data by sharing the color difference components of pixels of the same coordinate in a plurality of frames.

* * * * *